United States Patent
Yamamoto et al.

(10) Patent No.: US 10,611,115 B2
(45) Date of Patent: Apr. 7, 2020

(54) TANK COOLING DEVICE

(71) Applicant: Koyo Thermo Systems Co., Ltd., Nara (JP)

(72) Inventors: Akihito Yamamoto, Tenri (JP); Yasuhiro Sasaki, Tenri (JP); Iwao Morimoto, Tenri (JP)

(73) Assignee: Koyo Thermo Systems Co., Ltd., Nara (JP)

( * ) Notice: Subject to any disclaimer, the term of this patent is extended or adjusted under 35 U.S.C. 154(b) by 151 days.

(21) Appl. No.: 15/554,355

(22) PCT Filed: Oct. 26, 2015

(86) PCT No.: PCT/JP2015/080050
§ 371 (c)(1),
(2) Date: Aug. 29, 2017

(87) PCT Pub. No.: WO2016/194252
PCT Pub. Date: Dec. 8, 2016

(65) Prior Publication Data
US 2018/0050509 A1 Feb. 22, 2018

(30) Foreign Application Priority Data
May 29, 2015 (JP) .................... 2015-109806

(51) Int. Cl.
*B30B 15/34* (2006.01)
*F16J 12/00* (2006.01)
(Continued)

(52) U.S. Cl.
CPC .............. *B30B 15/34* (2013.01); *B29C 35/16* (2013.01); *B29C 70/16* (2013.01); *B29C 70/32* (2013.01);
(Continued)

(58) Field of Classification Search
CPC ......... B29C 35/16; B29C 70/16; B29C 70/32; B29C 70/54; B30B 15/34; F16J 12/00; F17C 1/06
(Continued)

(56) References Cited

U.S. PATENT DOCUMENTS

| 4,509,995 A * | 4/1985 | Hachisu | C21D 1/667 |
| | | | 148/664 |
| 6,903,306 B2 * | 6/2005 | Moller | F27B 5/16 |
| | | | 118/724 |

(Continued)

FOREIGN PATENT DOCUMENTS

| CN | 2300791 Y | 12/1998 |
| CN | 1279296 A | 1/2001 |

(Continued)

OTHER PUBLICATIONS

An Office Action issued by the Korean Patent Office (KIPO) dated Dec. 14, 2018, which corresponds to Korean Patent Application No. 10-2018-7027180 and is related to U.S. Appl. No. 15/554,355; with English language translation.

(Continued)

*Primary Examiner* — Jessee R Roe
*Assistant Examiner* — Michael Aboagye
(74) *Attorney, Agent, or Firm* — Studebaker & Brackett PC

(57) ABSTRACT

Provided is a tank cooling device that is capable of cooling a tank more quickly. A tank cooling device 4 has a nozzle 40. The nozzle 40 is comprised to supply cooling gas for cooling a tank 100 to an outer surface of the tank 100, with the cooling gas assisted by compressed gas in the nozzle 40. The tank 100 has a tank main body 101 made by using synthetic resin and an end member 102 made by using metal. The (Continued)

nozzle 40 supplies a gas flow to each of the tank main body 101 and the end member 102.

5 Claims, 8 Drawing Sheets

(51) Int. Cl.
*B29C 70/16* (2006.01)
*F17C 1/06* (2006.01)
*B29C 70/32* (2006.01)
*B29C 35/16* (2006.01)
*B29C 70/54* (2006.01)
*F17C 7/02* (2006.01)
*B29C 53/60* (2006.01)

(52) U.S. Cl.
CPC ............ *B29C 70/54* (2013.01); *F16J 12/00* (2013.01); *F17C 1/06* (2013.01); *F17C 7/02* (2013.01); *B29C 53/602* (2013.01); *B29C 2035/1658* (2013.01); *F17C 2201/0109* (2013.01); *F17C 2201/054* (2013.01); *F17C 2201/056* (2013.01); *F17C 2203/0604* (2013.01); *F17C 2203/066* (2013.01); *F17C 2203/0663* (2013.01); *F17C 2209/21* (2013.01); *F17C 2209/2154* (2013.01)

(58) Field of Classification Search
USPC .......................................... 266/44, 46, 259
See application file for complete search history.

(56) References Cited

U.S. PATENT DOCUMENTS

| | | | | |
|---|---|---|---|---|
| 6,904,953 | B2* | 6/2005 | Frick | B22D 11/1246 164/348 |
| 8,349,247 | B2* | 1/2013 | Ueno | B21B 45/0233 266/102 |
| 8,715,565 | B2* | 5/2014 | Sugiyama | B21B 45/0215 148/638 |
| 9,187,795 | B2* | 11/2015 | Katsumata | C21D 1/00 |
| 2002/0020948 | A1* | 2/2002 | Massot | C21D 1/613 266/81 |
| 2011/0108557 | A1 | 5/2011 | Tani et al. | |

FOREIGN PATENT DOCUMENTS

| | | |
|---|---|---|
| CN | 1329175 A | 1/2002 |
| CN | 1603021 A | 4/2005 |
| CN | 1806153 A | 7/2006 |
| CN | 201394585 Y | 2/2010 |
| CN | 102230651 A | 11/2011 |
| CN | 102230651 B | 1/2013 |
| JP | S61-121737 U1 | 7/1986 |
| JP | S62-029480 U1 | 2/1987 |
| JP | H04-217770 A | 8/1992 |
| JP | H07-167392 A | 7/1995 |
| JP | H09-202926 A | 8/1997 |
| JP | 2000-186799 A | 7/2000 |
| JP | 2000-193194 A | 7/2000 |
| JP | 2001-153296 A | 6/2001 |
| JP | 2002-097517 A | 4/2002 |
| JP | 2011-102614 A | 5/2011 |
| JP | 2013-068242 A | 4/2013 |

OTHER PUBLICATIONS

A Final Office Action issued by the Korean Patent Office (KIPO) dated Dec. 28, 2018, which corresponds to Korean Patent Application No. 10-2016-7036530 and is related to U.S. Appl. No. 15/554,355; with English language translation.
International Search Report issued in PCT/JP2015/080050; dated Jan. 19, 2016.
An Office Action issued by the Korean Patent Office (KIPO) dated Jul. 20, 2018, which corresponds to Korean Patent Application No. 10-2016-7036530 and is related to U.S. Appl. No. 15/554,355; with English language translation.
An Office Action issued by the State Intellectual Property Office of the People's Republic of China dated Mar. 12, 2019, which corresponds to Chinese Patent Application No. 201580035708.3 and is related to U.S. Appl. No. 15/554,355.
An Office Action mailed by the State Intellectual Property Office of People's Republic of China dated Sep. 16, 2019, which corresponds to Chinese Patent Application No. 201580035708.3 and is related to U.S. Appl. No. 15/554,355.
An Office Action mailed by the Indian Patent Office dated Sep. 23, 2019, which corresponds to Indian Patent Application No. 201717030691 and is related to U.S. Appl. No. 15/554,355.

* cited by examiner

FIG. 4

TANK COOLING DEVICE

TECHNICAL FIELD

The present invention relates to a tank cooling device.

BACKGROUND ART

Heat treatment may be performed when producing industrial products (see Patent Documents 1 to 3, for example). Patent Document 1 discloses a cooling nozzle for cooling a roll used when producing a metal sheet. Patent Document 2 discloses a cooling nozzle for cooling a metal sheet (strip) when producing the metal sheet. Patent Document 3 discloses a cooling nozzle for cooling a boat after diffusion treatment, the boat holding a semiconductor wafer when the diffusion treatment is being performed on the semiconductor wafer.

CITATION LIST

Patent Documents

Patent Document 1: Japanese Examined Utility Model Application Publication No. S62-29480
Patent Document 2: JP H9-202926A
Patent Document 3: Japanese Unexamined Utility Model Application Publication No. S61-121737

SUMMARY OF INVENTION

Technical Problem

Incidentally, heat treatment may be performed when producing tanks for storing a fluid or the like. For example, there are cases in which a tank having a reinforcing layer is formed by winding reinforcing fiber impregnated with resin around an outer surface of an elongated hollow resin member. A cap is attached to an end of the tank main body. The cap is made of, for example, metal. When producing the tank, the reinforcing layer is integrated with the tank main body by applying heat of one hundred and several tens of degrees in a state where the reinforcing layer has been wound around the outer surface of the main body. When the reinforcing layer of the thus configured tank is heated, the temperature of the entire tank becomes high. After the heat treatment on the reinforcing layer, the entire tank is cooled. In order to produce such a tank in a shorter time (that is, in order to increase the production efficiency), it is necessary to cool the tank in a shorter time.

In view of the above-described circumstances, it is an object of the present invention to provide a tank cooling device that is capable of cooling a tank more quickly.

Solution to Problem (1) In order to solve the above-described problem, an aspect of the present invention is directed to a tank cooling device, including: a nozzle comprised to supply cooling gas for cooling a tank to an outer surface of the tank, with the cooling gas assisted by compressed gas in the nozzle.

With this configuration, a nozzle supplies cooling gas to an outer surface of a tank, with the cooling gas assisted by compressed gas in the nozzle. Accordingly, the nozzle can blow a gas flow containing the cooling gas and the compressed gas onto the outer surface of the tank. A large amount of such a gas flow at a low temperature is blown onto the outer surface of the tank in a short time. Accordingly, heat retained by the tank which has been heated is quickly released from the outer surface of the tank to the outside of the tank. Thus, the tank cooling device can cool the tank more quickly.

(2) It is preferable that the tank cooling device is configured to cool the tank constituted by a plurality of members having different heat conductivities, and the nozzle is comprised to supply a gas flow containing the cooling gas and the compressed gas to each of the plurality of members.

Since the tank is constituted by a plurality of members having different heat conductivities, the cooling speed varies between the members of the tank. However, according to the above-described configuration, a gas flow is supplied from the nozzle to each of the plurality of members having different heat conductivities, and thus the entire tank can be more quickly cooled.

(3) It is more preferable that a plurality of the nozzles are provided, and at least one of the nozzles is comprised to supply the gas flow to each of the plurality of members.

With this configuration, the cooling speed of the tank can be increased regardless of differences between the materials forming the portions of the tank.

(4) It is preferable that the tank includes a tank main body made by using resin, and an end member made by using metal and attached to an end portion of the tank main body, the nozzle includes an end member nozzle, and the end member nozzle is comprised to supply the gas flow toward the end member.

With this configuration, the end member having better heat dissipation feature than that of the tank main body is cooled with a gas flow from the end member nozzle, and thus the tank can be more quickly cooled.

(5) It is more preferable that the end member nozzle is comprised to supply the gas flow toward a boundary portion between the plurality of materials.

With this configuration, the boundary portion between members having different heat conductivities becomes a non-continuous portion regarding heat conduction, and heat is likely to accumulate near the boundary portion. Accordingly, if the end member nozzle is used to cool the boundary portion, the boundary portion where heat is likely to accumulate in the tank can be more surely cooled. As a result, the cooling speed of the tank can be increased.

(6) It is more preferable that the tank includes a tank main body made by using resin, and an end member made by using metal and attached to an end portion of the tank main body, the nozzle includes a side portion nozzle, and the side portion nozzle is comprised to supply the gas flow toward the end portion of the tank main body.

With this configuration, the portion of the tank main body to which heat is easily transferred from the end member due to being relatively closer to the end member can be more surely cooled using the side portion nozzle. As a result, the cooling speed of the tank can be increased.

(7) It is preferable that the tank has a shape extending in a predetermined longitudinal direction, the nozzle includes a body nozzle, and the body nozzle is comprised to supply the gas flow toward a middle portion in the longitudinal direction of the tank.

With this configuration, the gas flow from the body nozzle is supplied to a middle portion (body) having a relatively large surface area in the tank main body. Accordingly, the cooling speed of the tank can be made more uniform. As a result, the tank can be more quickly cooled.

(8) It is preferable that the tank cooling device further includes: an accommodation chamber configured to accommodate the tank and to be supplied the cooling gas, and the nozzle includes a suction portion that sucks in the cooling gas supplied into the accommodation chamber, and an ejection portion that ejects the cooling gas assisted by the compressed gas.

With this configuration, the cooling gas is sucked from the suction portion into the nozzle in accordance with the ejecting of the compressed gas. The cooling gas is involved with the compressed gas inside the nozzle, and is discharged together with the compressed gas from the ejection portion of the nozzle. With this configuration, the nozzle can cause the compressed gas to carry a large amount of cooling gas. As a result, a larger amount of gas flow can be supplied to the tank in a short time. Thus, the tank cooling device can cool the tank in a shorter time.

(9) It is more preferable that the tank cooling device further includes: a guide member for guiding the cooling gas supplied into the accommodation chamber, toward the nozzle and the tank.

With this configuration, the amount of cooling gas supplied to the nozzle and the tank per unit time can be increased. Accordingly, the tank can be more quickly cooled.

(10) It is preferable that the tank cooling device further includes: a restriction member for restricting returning of the gas flow containing the cooling gas and the compressed gas discharged from the nozzle, from the tank toward the nozzle.

With this configuration, part of the gas flow from the nozzle toward the tank is reflected by the tank, and is oriented toward the nozzle. If such a gas flow moving toward the nozzle is received by the restriction member, a situation is more surely suppressed in which a high-temperature gas flow reflected by the tank returns to the suction portion of the nozzle.

(11) In order to solve the above-described problem, an aspect of the present invention is directed to a tank cooling device, including: an accommodation chamber configured to accommodate a tank; a guide member configured to guide cooling gas supplied into the accommodation chamber for cooling the tank, toward the tank; and a nozzle comprised to eject the cooling gas in the accommodation chamber toward the tank, with the cooling gas assisted by compressed gas in the nozzle.

With this configuration, a nozzle supplies cooling gas to an outer surface of a tank, with the cooling gas assisted by compressed gas in the nozzle. Accordingly, the nozzle can blow a gas flow containing the cooling gas and the compressed gas onto the outer surface of the tank. A large amount of such a gas flow at a low temperature is blown onto the outer surface of the tank in a short time. Accordingly, heat retained by the tank which has been heated is quickly released from the outer surface of the tank to the outside of the tank. Thus, the tank cooling device can cool the tank more quickly.

Advantageous Effects of Invention

According to the present invention, it is possible to provide a tank cooling device that is capable of cooling a tank more quickly.

BRIEF DESCRIPTION OF DRAWINGS

FIG. 4 is an enlarged side view of a portion around a first unit of the tank cooling device.

FIG. 8 is a schematic side view of a main portion showing an example of operations of nozzles and the like.

DESCRIPTION OF EMBODIMENT

Hereinafter an embodiment for carrying out the present invention will be described with reference to the drawings. It should be noted that the present invention is broadly applicable to tank cooling devices.

Figure 1:
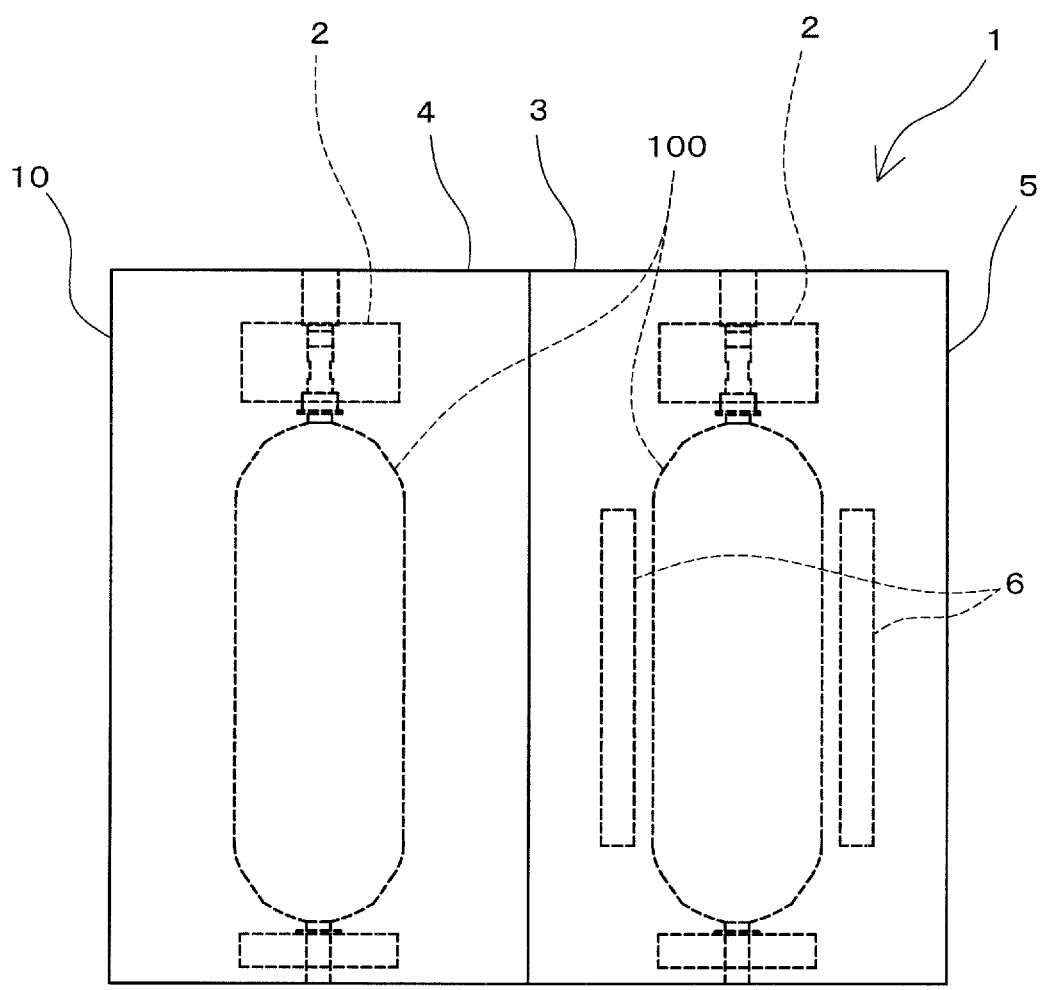
FIG. 1 is a schematic plan view of a heat treatment apparatus according to an embodiment of the present invention.
Figure 2:
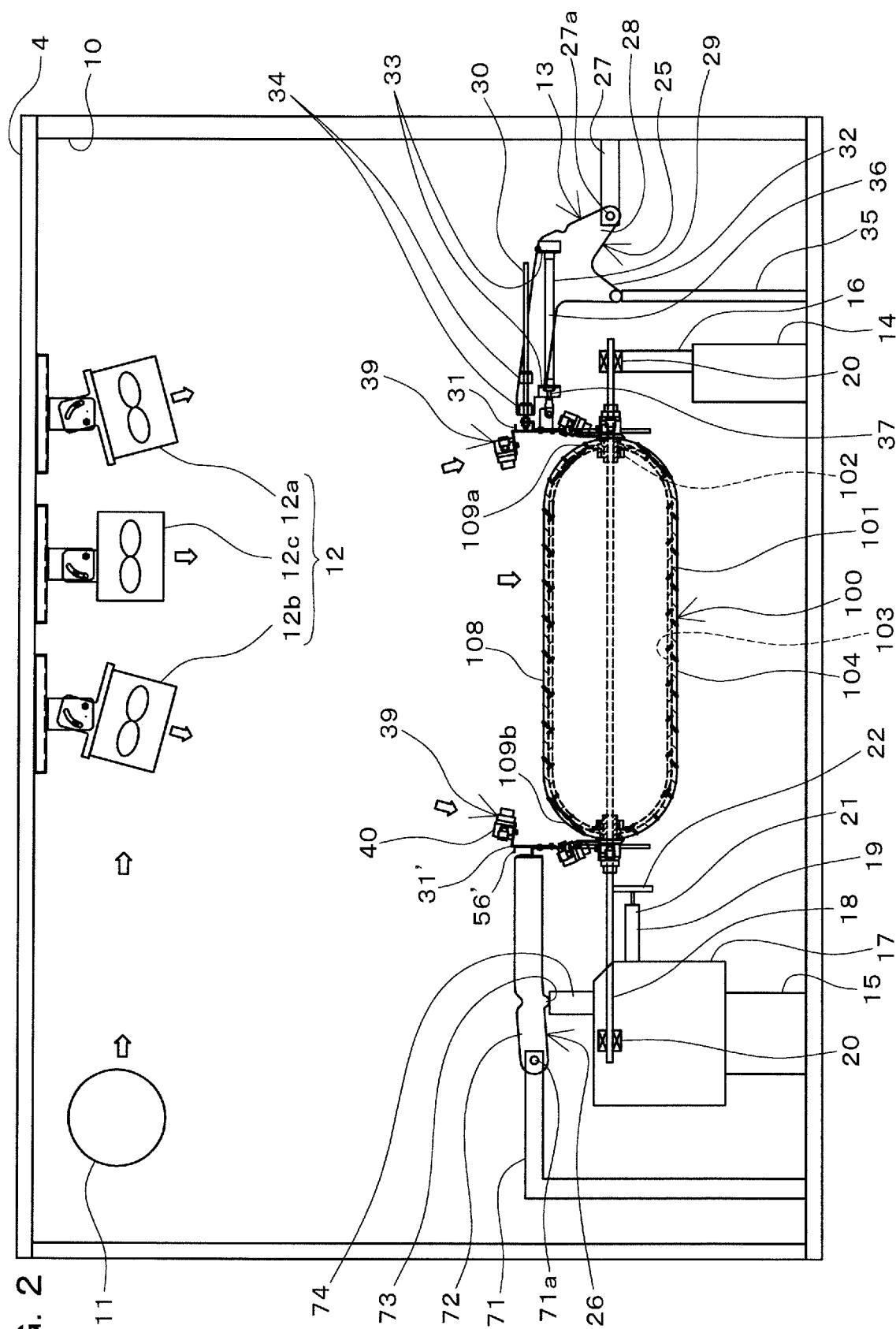
FIG. 2 is a schematic side view of a tank cooling device of the heat treatment apparatus.
Figure 3:
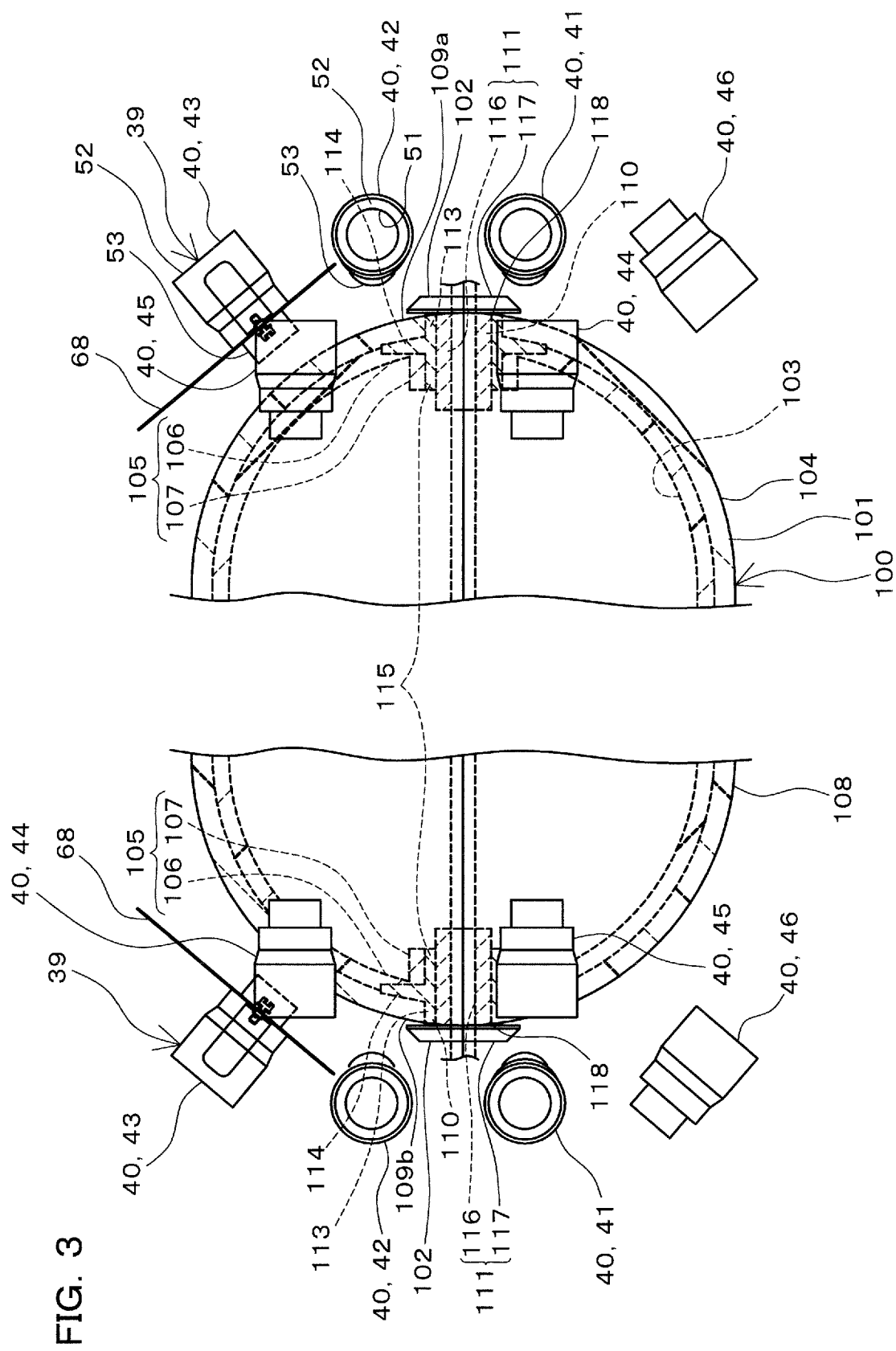
FIG. 3 is a schematic plan view showing a main portion of the tank cooling device.
Figure 4:
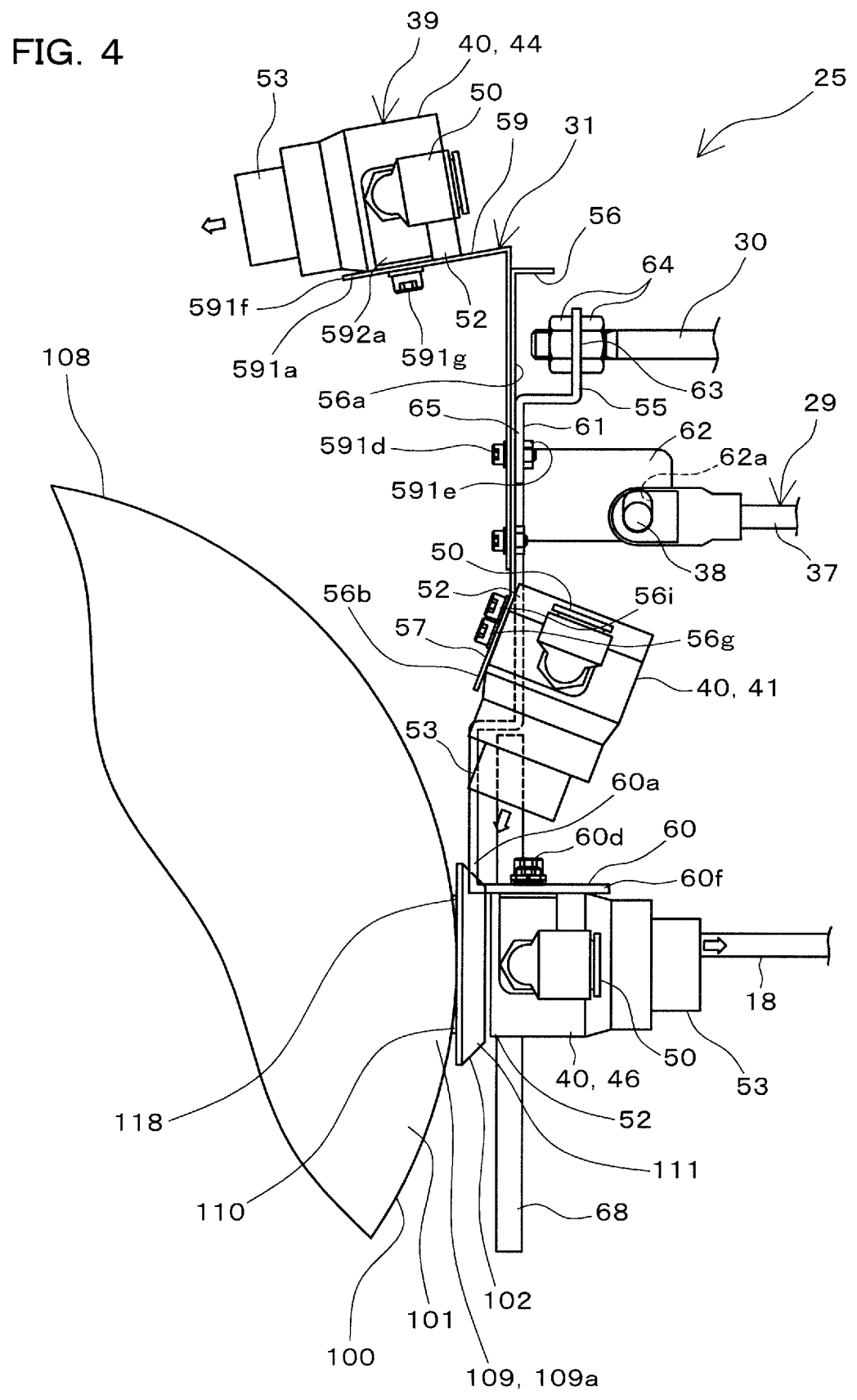
Figure 5:
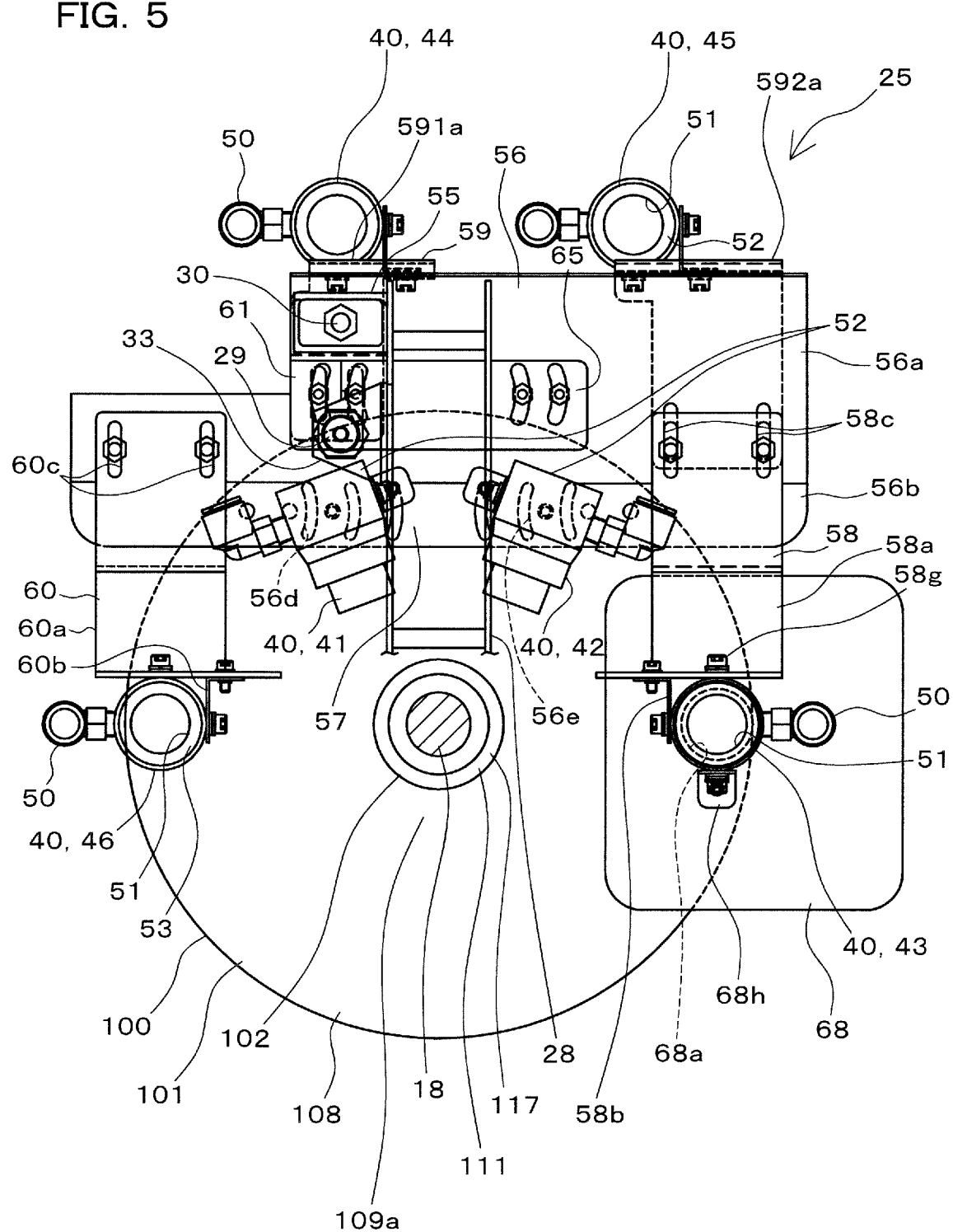
FIG. 5 is a rear view of the portion around the first unit, where some of the members are not shown.
Figure 6:
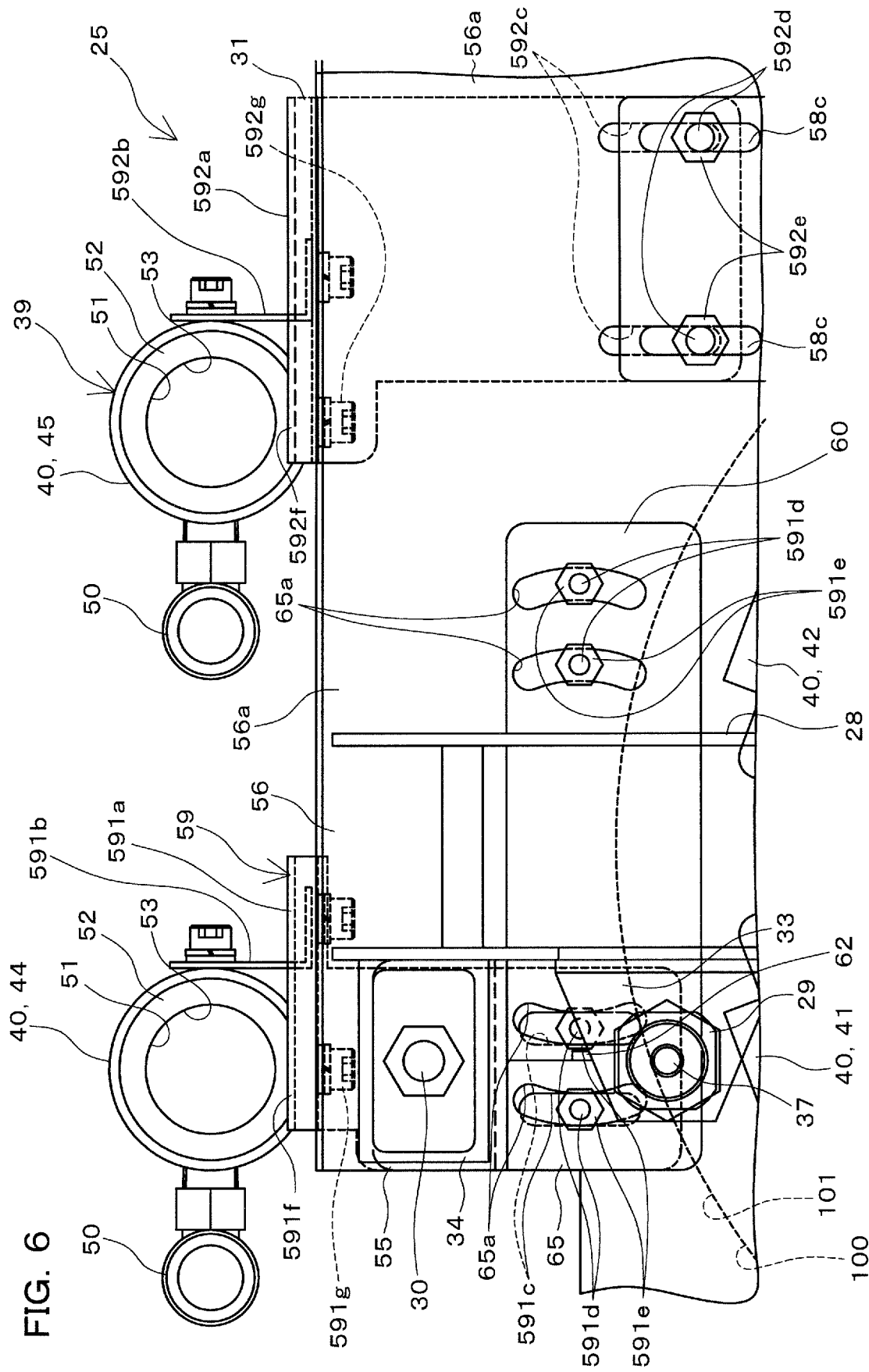
FIG. 6 is a partially enlarged rear view of the first unit.
Figure 7:
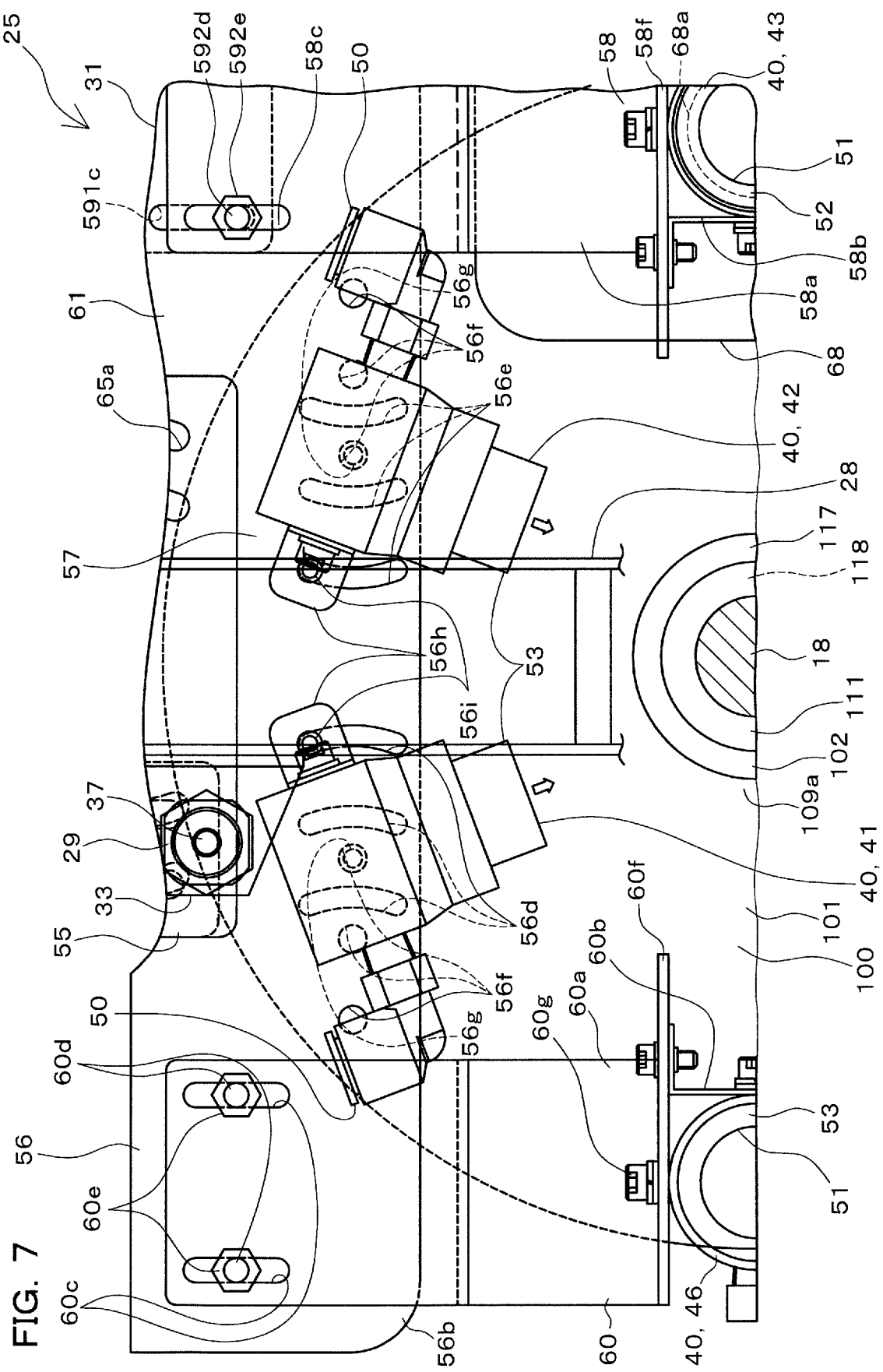
FIG. 7 is a partially enlarged rear view of the first unit.

FIG. 1 is a schematic plan view of a heat treatment apparatus 1 according to an embodiment of the present invention. FIG. 2 is a schematic side view of a tank cooling device 4 of the heat treatment apparatus 1. FIG. 3 is a schematic plan view showing a main portion of the tank cooling device 4. FIG. 4 is an enlarged side view of a portion around a first unit 25 of the tank cooling device 4. FIG. 5 is a rear view of the portion around the first unit 25, where some of the members are not shown. FIGS. 6 and 7 are partially enlarged rear views of the first unit 25. Note that the orientations of nozzles 40 (described later) may be slightly different between the drawings.

Referring to FIG. 1, the heat treatment apparatus 1 is provided in order to perform heat treatment on a tank 100.

The heat treatment apparatus 1 includes a conveying device 2, a tank heating device 3, and the tank cooling device 4.

The conveying device 2 is provided in order to convey the tank 100. The conveying device 2 is configured to hold the tank 100 in a state where both end portions of the tank 100 are held by the conveying device 2. The tank 100 is conveyed in a state of being held by the conveying device 2 from the outside of the heat treatment apparatus 1 into the tank heating device 3. The conveying device 2 conveys the tank 100 which has been heated, into the tank cooling device 4. The conveying device 2 conveys the tank 100 cooled by the tank cooling device 4, to the outside of the heat treatment apparatus 1.

The tank heating device 3 is provided in order to heat the tank 100. The tank heating device 3 has an accommodation chamber 5 for accommodating the tank 100 together with the conveying device 2, and heaters 6 for heating the tank 100 in the accommodation chamber 5.

Referring to FIGS. 2 and 3, the structure of the high-pressure tank 100 will be described below. The tank 100 is configured to store high-pressure gas, and has a shape extending in a predetermined longitudinal direction. In this embodiment, the tank 100 has a portion constituted by a plurality of layers made of resin, and end portions made of metal, and portions that have to be particularly intensively cooled are located in specific area. Thus, the tank 100, as a whole, has a configuration that cannot be easily cooled evenly. The tank 100 has a shape that is symmetric with respect to the longitudinal direction of the tank 100.

The tank 100 has a tank main body 101 that is a hollow member made by using resin, and end members 102 made by using metal and respectively attached to both end portions of the tank main body 101.

The tank main body 101 is in the shape of an elongated cylinder, and both end portions of the tank main body 101 are each in the shape of a hemisphere.

The tank main body 101 has a liner 103 that is an inner wall layer, and a reinforcing layer 104 that is an outer wall layer.

The liner 103 has substantially the same shape as that of the tank main body 101. The liner 103 is made of, for example, a hard resin such as polyethylene resin.

The liner 103 has folded-back portions 105 that are arranged inside the liner 103, at both end portions of the liner 103. Each of the folded-back portions 105 has a root portion 106 arranged to sandwich a projecting portion 114 (described later) of a cap 110 in cooperation with the reinforcing layer 104, and a cylindrical portion 107 connected to an tip end of the root portion 106.

According to the above configuration with regard to the tank main body 101, the tank main body 101 includes a cylindrical middle portion 108 (body), and hemispherical end portions 109a and 109b (side portions) that are respectively attached to both ends of the middle portion 108 in the longitudinal direction of the tank main body 101. The end members 102 are respectively attached to the end portions 109a and 109b.

Each of the end members 102 has the cap 110 fixed to the tank main body 101, and a valve assembly 111 attached to the cap 110.

The cap 110 is in the shape of a cylinder, and is inserted into the corresponding end portion of the liner 103. The cap 110 is made of, for example, an aluminum alloy, and is fixed to the tank main body 101.

The cap 110 has a first cylindrical end portion 113, the ring-like shaped projecting portion 114, and a second cylindrical end portion 115.

The first cylindrical end portion 113 is a cylindrical portion formed at one end portion of the cap 110. A tip end portion of the reinforcing layer 104 is fitted to the first cylindrical end portion 113. The projecting portion 114 is arranged adjacent to the first cylindrical end portion 113, and is disposed at a position between the root portion 106 of the liner 103 and the end portion of the reinforcing layer 104. The second cylindrical end portion 115 is formed at the other end portion of the cap 110, and is fitted to the cylindrical portion 107 of the liner 103.

The valve assembly 111 is attached to the cap 110 in order to control supply and discharge of a fluid such as storage gas between an external gas supply line (not shown) and the inside of the tank 100. The valve assembly 111 is, for example, in the shape of a T.

The valve assembly 111 has a valve main body 116 and a terminal portion 117.

The valve main body 116 is in the shape of a cylinder, and is fixed to the cap 110 in a state of being fitted into the cap 110. The cylindrical terminal portion 117 is formed at one end portion of the valve main body 116, and is received by the first cylindrical end portion 113 of the cap 110. The terminal portion 117 is arranged on the outside of the tank main body 101. The portion where the valve main body 116 and the terminal portion 117 are connected to each other also functions as a boundary portion 118 between the tank main body made of synthetic resin and the valve assembly 111 made of metal.

The reinforcing layer 104 is formed by winding reinforcing fiber impregnated with resin around an outer circumferential face of the liner 103 and the first cylindrical end portions 113 of the caps 110, and curing the resin by applying heat. Examples of the resin for the reinforcing layer 104 may include epoxy resin and the like. Another example of the reinforcing fiber may include carbon fiber, metal fiber, and the like. In the heat treatment apparatus 1, the tank heating device 3 heats and melts the resin to fix the reinforcing layer 104 to the liner 103. The tank cooling device 4 of the heat treatment apparatus 1 is provided in order to more quickly cool the tank 100 which has been heated.

The tank cooling device 4 will be described in more detail as explained below. Referring to FIGS. 2 and 4, in this embodiment, the tank cooling device 4 is comprised to cool the tank 100 constituted by a plurality of members (in the present embodiment, the tank main body 101 made of synthetic resin and the end members 102 made of metal) having different heat conductivities.

The tank cooling device 4 has the conveying device 2, an accommodation chamber 10, a cooling gas supply portion 11, guide members 12, and a cooling unit 13.

The accommodation chamber 10 accommodates the guide members 12, the cooling unit 13, and the tank 100 in a state of being held by the conveying device 2. The accommodation chamber 10 defines a space, for example, in the shape of a box. The conveying device 2 is arranged on the floor of the accommodation chamber 10.

The conveying device 2 has a first pedestal portion 14, a second pedestal portion 15, a first base portion 16, a second base portion 17, a support shaft 18, and a rotational drive mechanism 19.

The pedestal portions 14 and 15 are configured to convey among the accommodation chamber 5 of the tank heating device 3, the accommodation chamber 10 of the tank cooling device 4, and the outside of the heat treatment apparatus 1, using a power source such as an unshown motor. The first pedestal portion 14 supports the first base portion 16, and the second pedestal portion 15 supports the second base portion 17.

The first base portion 16 and the second base portion 17 are configured to convey together with the corresponding first pedestal portion 14 and the second pedestal portion 15. The first base portion 16 and the second base portion 17 support the support shaft 18 in cooperation with each other. More specifically, bearings 20 are respectively attached to the first base portion 16 and the second base portion 17. One end portion and the other end portion of the support shaft 18 are respectively supported in a rotatable manner by the corresponding bearings 20.

The second base portion 17 is provided with the rotational drive mechanism 19. The rotational drive mechanism 19 is configured to rotate the tank 100 about the center axis of the support shaft 18 at a predetermined rotational speed during cooling treatment on the tank 100. The rotational drive mechanism 19 has an electric motor 21 supported by the second base portion 17. A roller 22 is coupled to the output shaft in the electric motor 21 rotatably together. The roller 22 is in frictional contact with the support shaft 18. According to the above configuration with regard to the rotational drive mechanism 19, when the roller 22 rotates in accordance with the driving of the electric motor 21, the support shaft 18 and the tank 100 supported rotatably together by the support shaft 18 rotate together.

The support shaft 18 is provided to support the tank 100 at a position between the pair of base portions 16 and 17. The support shaft 18 supports both end portions of the tank 100 in a state of extending through the tank 100. The cooling gas supply portion 11 is arranged above the thus configured conveying device 2.

The cooling gas supply portion 11 is provided in order to supply cooling gas to the tank 100 for cooling the tank 100.

The cooling gas supply portion 11 is constituted, for example, by a duct or the like, and is connected to an unshown cooling gas generator (e.g., an air conditioner). The cooling gas supply portion 11 is connected to a hole portion formed through a side wall of the accommodation chamber 10, and supplies cooling gas from the cooling gas generator toward the vicinity of the ceiling of the accommodation chamber 10. Examples of the cooling gas may include colded air and the like. The cooling gas supplied from the cooling gas supply portion 11 is guided by the guide members 12 toward the tank 100 and the cooling unit 13.

The guide members 12 are provided to guide cooling gas supplied into the accommodation chamber 10 for cooling the tank 100, toward the tank 100 and the nozzles 40 (described later) of the tank cooling device 4. The guide members 12 are, for example, electric fans. For example, a plurality of such guide members 12 (three guide members 12 in this embodiment) are provided on the ceiling of the accommodation chamber 10.

The plurality of guide members 12 are arranged adjacent to each other. The guide members 12 (12a, 12b, and 12c) send cooling gas from the cooling gas supply portion 11 to the lower side. More specifically, the guide member 12a sends cooling gas toward the first unit 25 (described later) of the cooling unit 13. The guide member 12b sends cooling gas toward a second unit 26 (described later) of the cooling unit 13. The guide member 12c sends cooling gas toward the middle portion 108 of the tank 100. The cooling unit 13 is arranged below the guide members 12. The cooling unit 13 is provided in order to supply cooling gas to the outer surface of the tank, with the cooling gas assisted by compressed gas in the later described nozzles 40.

The cooling unit 13 has the first unit 25 arranged on the one end portion 109a side of the tank 100 and the second unit 26 arranged on the other end portion 109b side of the tank 100.

Note that, in the description below, the left-right direction on the sheet of the rear view in FIG. 5 (the rear view of the first unit 25 in FIG. 5) is simply referred to as the "left-right direction". In the description below, a description will be made using, as a reference, the arrangement of portions when the tank cooling device 4 is performing a cooling operation on the tank 100, unless otherwise described.

Referring to FIG. 2, the first unit 25 is provided to supply cooling gas to the outer surface of the one end portion 109a of the tank 100 and the outer surface of the middle portion 108 of the tank 100.

The first unit 25 has an arm support portion 27, a swing arm 28, a cylinder mechanism 29, a guide member 30, and a sub unit 31.

The arm support portion 27 is fixed to a side wall of the accommodation chamber 10. The arm support portion 27 has a support shaft 27a extending in the left-right direction, and supports the swing arm 28 such that the swing arm 28 can swing about the support shaft 27a.

The swing arm 28 is held such that the swing arm 28 can swing about the support shaft 27a using an unshown power source (air cylinder, etc.). The swing arm 28 has a configuration in which two plate members each substantially in the shape of a "y" in a side view are arranged in parallel to each other with a space between these two plate members in the left-right direction, and these two plate members are fixed to each other via a plurality of shaft members.

The swing arm 28 has a stopper receiving portion 32, a cylinder holding portion 33, and a guide holding portion 34.

The stopper receiving portion 32 is arranged adjacent to the support shaft 27a. The stopper receiving portion 32 is configured to be received by a stopper 35 fixed to the floor of the accommodation chamber 10. When the stopper receiving portion 32 is received by the stopper 35, the swing arm 28 is kept in an orientation extending toward the tank 100.

The cylinder holding portion 33 is a member arranged to hold a cylinder 36 (described later) of the cylinder mechanism 29. The cylinder holding portion 33 is formed on one side face of the swing arm 28. The guide holding portion 34 is formed adjacent to the cylinder holding portion 33.

The guide holding portion 34 is configured to hold the guide member 30 in a state that the guide member 30 can slide with respect to the guide holding portion 34. The guide holding portion 34 is formed on one side face of the swing arm 28.

The cylinder mechanism 29 is configured to convey the sub unit 31 in a direction closer to the tank 100 and a direction away from the tank 100 (the longitudinal directions of the tank 100), in cooperation with the guide member 30. The cylinder mechanism 29 is a cylinder that operates using fluid pressure such as air pressure.

Referring to FIGS. 2 and 4, the cylinder mechanism 29 has the cylinder 36 and a cylinder rod 37.

The cylinder 36 is in the shape of an elongated rectangular cylinder. Both end portions of the cylinder 36 are fixed to the cylinder holding portion 33. The cylinder rod 37 is provided so as to project from the cylinder 36. The cylinder rod 37 is configured to convey along the axial direction of the cylinder rod 37 relative to the cylinder 36. A tip end portion of the cylinder rod 37 is coupled via a coupling shaft 38 to a first coupling portion 62 of a sub plate 55 (described later) of the sub unit 31. The guide member 30 supports the sub plate 55 in cooperation with the cylinder rod 37.

The guide member 30 is held by the guide holding portion 34, and is arranged parallel to the cylinder rod 37 of the cylinder mechanism 29. A middle portion of the guide member 30 is held by the guide holding portion 34. A tip end portion of the guide member 30 is fixed to a second coupling portion 63 of the sub plate 55 of the sub unit 31.

The sub unit 31 is configured to hold a nozzle unit 39. The sub unit 31 is configured to allow the positions of the plurality of nozzles 40 (described later) to change, and is thus arranged to perform more precise pinpoint cooling on portions of the tank 100, in particular, portions that are not easy to be cooled. The sub unit 31 is arranged at a position corresponding to the position of the cylinder rod 37 of the cylinder mechanism 29.

Referring to FIGS. 2 to 5, the nozzle unit 39 has a plurality of nozzles 40 (41 to 46).

In this embodiment, the plurality of nozzle 41 to 46 are collectively referred to simply as the "nozzles 40". The nozzles 40 are comprised such that cooling gas supplied into the accommodation chamber 10 for cooling the tank 100 is supplied (ejected) onto the outer surface of the tank 100, with the cooling gas assisted by compressed gas in the nozzles 40. More specifically, the nozzles 40 are comprised to supply a gas flow containing cooling gas and compressed gas to each of a plurality of members (the tank main body 101 and the end members 102) of the tank 100, the members being made of different materials. In this embodiment, the configuration is such that at least one nozzle 40 is comprised to supply the gas flow to each of the plurality of members.

The nozzles 40 have a similar configuration. Each nozzle 40, as a whole, has a cylindrical shape. A joint 50 is attached to the outer circumferential surface of each nozzle 40. The joint 50 is connected to a flexible hose (not shown). This hose is connected to a gas compressor such as an air compressor. According to the above configuration with regard to the nozzles 40, compressed gas from the gas compressor is supplied to each nozzle 40. This compressed gas may be cooled by an air conditioner or the like.

The nozzle 40 has a through hole portion 51 extending through the nozzle 40 in the axial direction of the nozzle 40. The through hole portion 51 defines a columnar space, and is open at both end faces of the nozzle 40 in the axial direction of the nozzle 40.

A suction portion 52 is formed at one end of the through hole portion 51, and an ejection portion 53 is formed at the other end of the through hole portion 51.

The suction portion 52 is formed as a portion that sucks in cooling gas supplied into the accommodation chamber 10. On the other hand, the ejection portion 53 is formed as a portion that discharges the cooling gas together with compressed gas. The nozzle 40 has an air vent (not shown) between the through hole portion 51 and the joint 50.

According to the above configuration with regard to the nozzle 40, when compressed gas is supplied to the nozzle 40, the compressed gas flows through the air vent and is blasted from the inner peripheral surface of the through hole portion 51 into the through hole portion 51, and further flows toward the ejection portion 53. In accordance with the flow of this compressed gas, the cooling gas inside the accommodation chamber 10 is carried from the suction portion 52 into the through hole portion 51.

The cooling gas in a state of being accelerated (assisted) by the compressed gas is vigorously ejected together with the compressed gas from the ejection portion 53 to the outside of the nozzle 40 (that is, toward the tank 100). According to the above configuration with regard to the nozzle 40, the nozzle 40 can suck in a large amount of cooling gas, by means of the compressed gas. That is to say, the nozzle 40 can spray a large amount of cooling gas onto the tank 100.

As the nozzles 40, end member nozzles 41 and 42, a side portion nozzle 43, body nozzles 44 and 45, and a device cooling nozzle 46 are provided.

Note that the number of end member nozzles 41 and 42, side portion nozzle 43, body nozzles 44 and 45, and device cooling nozzle 46 is not limited to those given as an example in this embodiment, and one or a plurality of each type of nozzles may be provided. Any of the end member nozzles 41 and 42, the side portion nozzle 43, the body nozzles 44 and 45, and the device cooling nozzle 46 may be omitted.

The end member nozzles 41 and 42 are comprised to supply a gas flow of cooling gas and compressed gas (hereinafter, this may be simply referred to as "gas flow") toward the end member 102 at the one end portion 109*a* of the tank 100 (in particular, the terminal portion 117 of the valve assembly 111). Furthermore, in this embodiment, the end member nozzles 41 and 42 are comprised to supply a gas flow toward the boundary portion 118 (boundary portion between the tank main body 101 made of resin and the cap 110 made of metal) where the materials are different in the tank 100.

In this embodiment, the end member nozzles 41 and 42 are arranged above the end member 102, and form a pair of left and right nozzles. The end member nozzles 41 and 42 are arranged substantially in the middle in the up-down direction of the sub unit 31 and substantially in the middle in the left-right direction of the sub unit 31.

The through hole portions 51 of the end member nozzles 41 and 42 are arranged to be oriented substantially in the vertical direction. The suction portions 52 of the end member nozzles 41 and 42 are arranged to be oriented toward the guide members 12 (the upper side). According to the above arrangement with regard to the end member nozzles 41 and 42, the cooling gas from the guide members 12 more smoothly enter the end member nozzles 41 and 42. The ejection portions 53 of the end member nozzles 41 and 42 are oriented toward the terminal portion 117 of the valve assembly 111 and the boundary portion 118 at the end member 102. According to the above configuration with regard to the end member nozzles 41 and 42, the gas flow ejected from the end member nozzles 41 and 42 is blown mainly onto the terminal portion 117 of the valve assembly 111 and the boundary portion 118 (the portions exposed from the tank main body 101). Accordingly, the end member 102 (the cap 110 and the valve assembly 111) is cooled. The side portion nozzle 43 is arranged below the end member nozzles 41 and 42.

The side portion nozzle 43 is comprised to supply a gas flow toward the end portion 109*a* of the tank main body 101. That is to say, the side portion nozzle 43 is comprised to supply the gas flow toward the vicinity of the plurality of portions (the boundary portion 118 between the tank main body 101 and the cap 110 of the end member 102) made of different materials.

In this embodiment, the side portion nozzle 43 is arranged substantially at the lower end in the up-down direction of the sub unit 31 and on one end side (the right end side) in the left-right direction of the sub unit 31. The side portion nozzle 43 is arranged on one side (the right side) in the left-right direction of the end member 102.

The through hole portion 51 of the side portion nozzle 43 is arranged so as to be oriented substantially in the horizontal direction. The ejection portion 53 of the side portion nozzle 43 is oriented toward the outer surface of the reinforcing layer 104 at the end portion 109*a*. According to the above configuration with regard to the side portion nozzle 43, the gas flow ejected from the side portion nozzle 43 is blown mainly onto the end portion 109*a* (the hemispherical portion of the tank 100). Accordingly, the end portion 109*a* of the tank 100 is cooled. The device cooling nozzle 46 is arranged on the left side of the side portion nozzle 43.

The device cooling nozzle 46 is comprised to supply a gas flow toward devices inside the accommodation chamber 10. That is to say, the device cooling nozzle 46 is comprised to supply a gas flow for cooling, toward the devices included in the tank cooling device 4. The device cooling nozzle 46 generates a gas flow, thereby generating the gas flow for cooling the tank 100 as well. In this embodiment, the device cooling nozzle 46 is comprised to supply a gas flow toward the cylinder mechanism 29.

In this embodiment, the device cooling nozzle 46 is arranged substantially at the lower end in the up-down direction of the sub unit 31 and on the other end side (the left end side) in the left-right direction of the sub unit 31. The through hole portion 51 of the device cooling nozzle 46 is arranged to be oriented substantially in the horizontal direction. The ejection portion 53 of the device cooling nozzle 46 is oriented toward the bearings 20. According to the above configuration with regard to the device cooling nozzle 46, the gas flow ejected from the device cooling nozzle 46 is blown mainly onto the bearings 20 and a portion around the cylinder 36. Accordingly, the bearings 20 and the cylinder mechanism 29 are cooled. The body nozzles 44 and 45 are arranged above the side portion nozzle 43.

The body nozzles 44 and 45 are comprised to supply a gas flow toward the outer surface of the tank 100 at the middle portion 108 of the tank 100. In this embodiment, the body nozzles 44 and 45 are arranged above the tank 100. In this embodiment, the body nozzles 44 and 45 are arranged above the end member 102, and form a pair of left and right nozzles. The body nozzles 44 and 45 are arranged at the upper end in the up-down direction of the sub unit 31.

The body nozzles 44 and 45 are arranged such that the ejection portions 53 have a slightly downward orientation. The ejection portions 53 of the body nozzles 44 and 45 are oriented toward the outer surface of the middle portion 108 (body) of the tank 100. According to the above configuration with regard to the body nozzles 44 and 45, the gas flow ejected from the body nozzles 44 and 45 is blown mainly onto the outer surface of the reinforcing layer 104 at the middle portion 108 of the tank 100. Accordingly, the tank 100 is cooled at the middle portion 108 of the tank main body 101 made of resin.

The thus configured nozzles 40 of the nozzle unit 39 are supported by the sub unit 31. That is to say, the sub unit 31 holds all of the plurality of nozzles 40 in block. The sub unit 31 is swung about the support shaft 27a together with the swing arm 28 and the nozzles 40, in accordance with the swing arm 28 swinging about the support shaft 27a.

Figure 8:
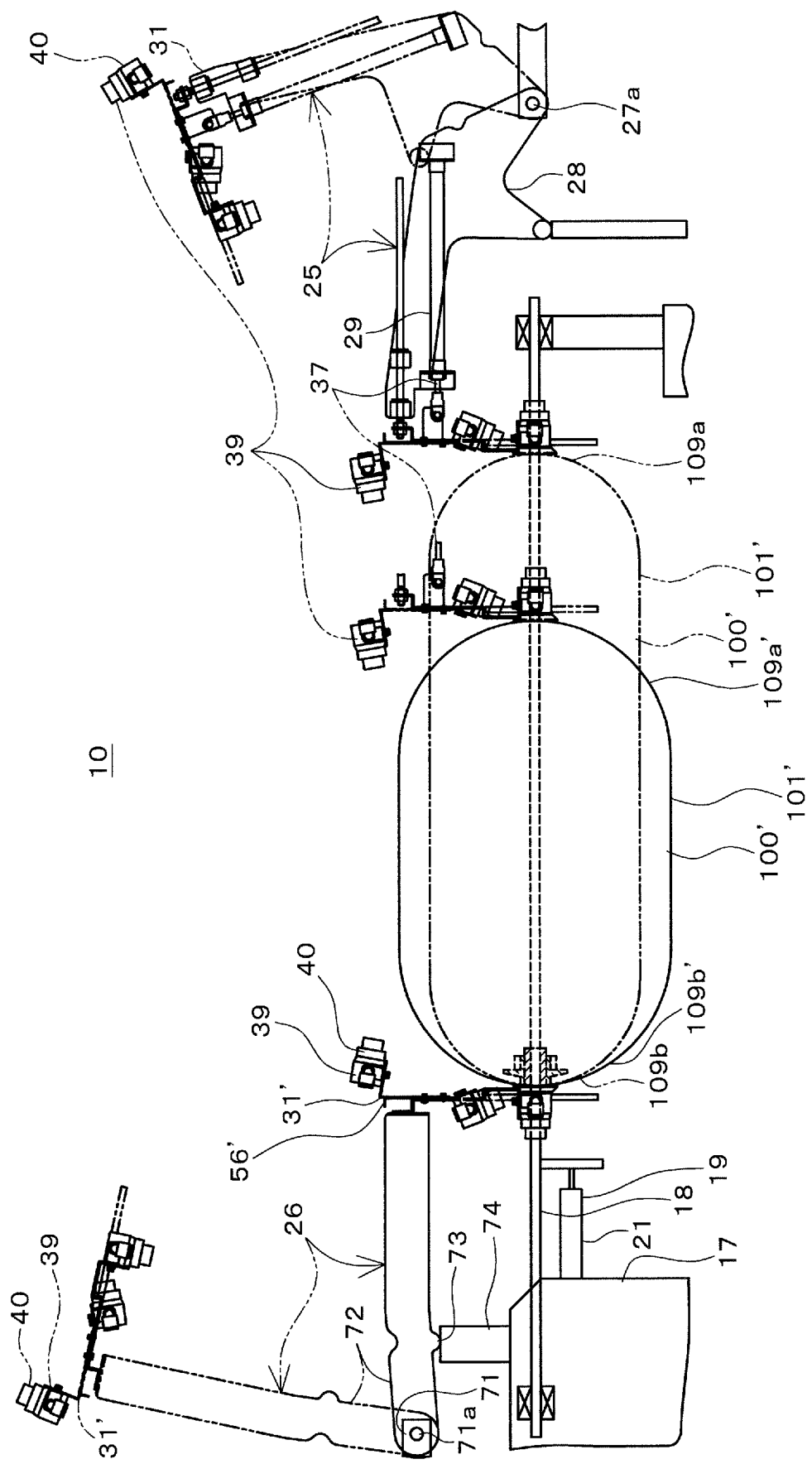

When the tank 100 is conveyed into and out of the accommodation chamber 10, as shown in FIG. 8, the swing arm 28, the sub unit 31, and the nozzles 40 are arranged on the upper side of the support shaft 27a. Accordingly, the tank 100 can be smoothly conveyed into and out of the accommodation chamber 10. FIG. 8 is a schematic side view of a main portion showing an example of operations of the nozzles 40 and the like.

Again referring to FIGS. 2 to 5, the sub unit 31 has the sub plate 55, a main plate 56, an end member nozzle holding portion 57, a side portion nozzle holding portion 58, a body nozzle holding portion 59, and a device cooling nozzle holding portion 60.

The end member nozzle holding portion 57, the side portion nozzle holding portion 58, the body nozzle holding portion 59, and the device cooling nozzle holding portion 60 are configured to be able to adjust the orientations of the corresponding end member nozzles 41 and 42, the side portion nozzle 43, the body nozzles 44 and 45, and the device cooling nozzle 46.

The sub plate 55 is provided as a member that is coupled to the cylinder rod 37 of the cylinder mechanism 29 and the guide member 30, and supports the main plate 56. The sub plate 55 is arranged at a position between the swing arm 28 and the main plate 56. The sub plate 55 is made of a metal plate, and has a configuration in which part of the flat plate is bent.

The sub plate 55 has a flat plate main body 61, the first coupling portion 62, and the second coupling portion 63.

The first coupling portion 62 is formed as a portion that extends from the plate main body 61 so as to be orthogonal to the plate main body 61, and is coupled via the coupling shaft 38 to the cylinder rod 37 of the cylinder mechanism 29. More specifically, a tip end portion of the first coupling portion 62 has an elongated hole portion 62a extending in the up-down direction. A coupling shaft 38 of the cylinder rod 37 is inserted into the elongated hole portion 62a, and is arranged to move in the up-down direction for a predetermined length relative to the first coupling portion 62. The second coupling portion 63 is arranged, for example, above the first coupling portion 62.

The second coupling portion 63 is formed as a portion that extends from the plate main body 61. The second coupling portion 63 has a through hole through which the guide member 30 extends. The tip end portion of the guide member 30 has a male screw shaft, and is fixed to the second coupling portion 63 by means of a pair of nuts 64 that are screwed to this male screw portion of the male screw shaft.

According to the above configuration with regard to the sub unit 31, when the cylinder rod 37 of the cylinder mechanism 29 is conveyed along the axial direction of the cylinder rod 37 relative to the cylinder 36, the sub plate 55 (the sub unit 31) and the nozzles 40 move closer to the tank 100 or away from the tank 100. Accordingly, the nozzles 40 can be arranged at optimal positions corresponding to each of a plurality of types of tanks having different total lengths. In this embodiment, a sub plate coupling portion 65 is formed in the plate main body 61.

Referring to FIGS. 4 to 6, the sub plate coupling portion 65 is provided in order to fix the main plate 56 to the sub plate 55. The sub plate coupling portion 65 is configured to change the position of the main plate 56 relative to the sub plate 55. Specifically, the sub plate coupling portion 65 has a plurality of arc hole portions 65a (four arc hole portions 65a in this embodiment).

Each of the arc hole portions 65a is in the shape of an arc centered about a predetermined center axis parallel to the center axis of the tank 100. In this embodiment, two arc hole portions 65a are coaxially formed through the right portion in the sub plate coupling portion 65, and two arc hole portions 65a are coaxially formed through the left portion in the sub plate coupling portion 65. The main plate 56 is fixed to the sub plate coupling portion 65.

The main plate 56 is provided to hold the end member nozzle holding portion 57, the side portion nozzle holding portion 58, the body nozzle holding portion 59, and the device cooling nozzle holding portion 60. The main plate 56 is in the shape of a flat plate that is elongated in the left-right direction and is partially bent.

The main plate 56 has a flat plate portion 56a, and an inclined portion 56b that extends so as to be inclined from the lower end portion of the flat plate portion 56a.

The flat plate portion 56a is in the shape of a portion that is elongated in the left-right direction, and, in this embodiment, is in the shape of an L in a rear view. Through holes (not shown) respectively adjacent to the arc hole portions 65a of the sub plate coupling portion 65 are formed through the flat plate portion 56a. The position of the main plate 56 about the center axis of the arc hole portions 65a can be changed relative to the sub plate 55. Bolts 591d as fixing members are respectively inserted into the corresponding through hole portions and the corresponding arc hole portions 65a. The bolts 591d fasten (fix) the sub plate 55 and the main plate 56 to each other in cooperation with corresponding nuts 591e.

The inclined portion 56b extends from the lower edge portion of the flat plate portion 56a. The inclined portion 56b is inclined closer to the tank 100 toward the lower side. In this embodiment, the middle portion in the left-right direction of the inclined portion 56b is provided with the end member nozzle holding portion 57. The end member nozzle holding portion 57 is provided in order to hold the end member nozzles 41 and 42.

Referring to FIGS. 4, 5, and 7, the end member nozzle holding portion 57 has a plurality of first arc hole portions 56d and a plurality of second arc hole portions 56e formed through the inclined portion 56b of the main plate 56, a plurality of nozzle fixing hole portions 56f, and a plurality of stays 56h.

The first arc hole portions 56d are provided in order to fix the end member nozzle 41 on the left side in a rear view. For example, a plurality of such first arc hole portions 56d (three first arc hole portions 56d in this embodiment) are provided. The first arc hole portions 56d are arranged substantially at equal intervals in the left-right direction at positions adjacent to the end member 102, in the inclined portion 56b of the main plate 56. The end member nozzle 41 can be selectively fixed to the first arc hole portions 56d. In this embodiment, each of the first arc hole portions 56d is in the shape of an arc projecting toward the second arc hole portions 56e.

The second arc hole portions 56e are provided in order to fix the end member nozzle 42 on the right side in a rear view. For example, a plurality of such second arc hole portions 56e (three second arc hole portions 56e in this embodiment) are provided. The second arc hole portions 56e are bilaterally symmetric to the first arc hole portions 56d in the inclined portion 56b. The corresponding end member nozzle 42 can be selectively fixed to the second arc hole portions 56e. The nozzle fixing hole portions 56f are formed corresponding to the first arc hole portions 56d and the second arc hole portions 56e.

The number of nozzle fixing hole portions 56f is the same as the sum of the number of first arc hole portions 56d and the number of second arc hole portions 56e. The nozzle fixing hole portions 56f are respectively arranged adjacent to the corresponding arc hole portions 56d and 56e. The nozzle fixing hole portions 56f are through holes extending through the inclined portion 56b. Bolts 56g as fixing members inserted into any of the nozzle fixing hole portions 56f are screwed to the outer circumferential portions of the corresponding end member nozzles 41 and 42. According to the above configuration with regard to the nozzle fixing hole portions 56f, the bolts 56g fix the corresponding end member nozzles 41 and 42 to the main plate 56. The stays 56h are respectively attached to the end member nozzles 41 and 42.

The stays 56h are, for example, each in the shape of an L, and are fixed to the outer circumferential portions of the corresponding end member nozzles 41 and 42. Bolts 56i extend respectively through the stays 56h. The bolts 56i also extend through the corresponding arc hole portions 56d and 56e, and are screwed into female screw portions formed in the corresponding stays 56h, so that the stays 56h are fixed to the inclined portion 56b of the main plate 56. According to the above configuration with regard to the end member nozzles 41 and 42, the end member nozzles 41 and 42 can change the positions relative to the main plate 56, and can change the positions about the corresponding bolts 56g. That is to say, the end member nozzles 41 and 42 are comprised to be changed their positions and orientations relative to the end member 102.

The side portion nozzle holding portion 58 is arranged on the lower right side of the thus configured end member nozzle holding portion 57.

Referring to FIGS. 3, 5, and 6, the side portion nozzle holding portion 58 has a movable plate 58a and a stay 58b.

The movable plate 58a is formed, for example, by bending a metal plate. The movable plate 58a has, for example, two vertically elongated hole portions 58c. A plurality of such vertically elongated hole portions 58c (two vertically elongated hole portions 58c in this embodiment) are arranged with a space interposed between the vertically elongated hole portions 58c in the left-right direction. The vertically elongated hole portions 58c extend in the up-down direction.

Bolts 592d as fixing members are provided extending through the vertically elongated hole portions 58c and the right end portion of the main plate 56. The bolts 592d fasten the movable plate 58a to the main plate 56 in cooperation with corresponding nuts 592e. According to the above configuration with regard to the movable plate 58a, the position of the movable plate 58a (the side portion nozzle 43) can be adjusted in the up-down direction relative to the main plate 56. A receiving portion 58f is formed on the lower portion of the movable plate 58a.

The receiving portion 58f is formed by bending the middle portion in the up-down direction of the movable plate 58a, and extends in the horizontal direction. The side portion nozzle 43 is fixed via a bolt 58g as a fixing member to the receiving portion 58f. The bolt 58g extends in the up-down direction, and the position of the side portion nozzle 43 can be adjusted about the axis of the bolt 58g. The side portion nozzle 43 is fixed to the receiving portion 58f by using the L-shaped stay 58b, and a constant orientation of the side portion nozzle 43 is maintained. The stay 58b has an arc hole portion (not shown) that is coaxial with the bolt 58g in a plane view, and a bolt for fixing the stay 58b to the receiving portion 58f is arranged in this arc hole portion. According to the above configuration, the position of the stay 58b can be adjusted about the bolt 58g. A restriction member 68 is attached to the side portion nozzle 43.

The restriction member 68 is provided in order to restrict returning of flow of the gas containing cooling gas and compressed gas discharged from the side portion nozzle 43, from the tank 100 side toward the side portion nozzle 43. Note that the restriction member 68 may be provided also on at least one of the end member nozzles 41 and 42, the body nozzles 44 and 45, and the device cooling nozzle 46.

The restriction member 68 is a plate member made of a so-called baffle plate, and, in this embodiment, is substantially in the shape of a rectangle. A through hole portion 68a into which the side portion nozzle 43 is inserted is formed through a portion substantially in the middle of the restriction member 68. When the side portion nozzle 43 is inserted into the through hole portion 68a, the restriction member 68 is arranged in the middle portion of the side portion nozzle 43, in the axial direction of the side portion nozzle 43. The restriction member 68 in a state of facing the end portion 109a of the tank 100 surrounds the side portion nozzle 43.

Providing the restriction member 68 prevents gas ejected from the ejection portion 53 of the side portion nozzle 43 from being reflected by the tank 100 to return to the suction portion 52 of the side portion nozzle 43.

The restriction member 68 is fixed to the side portion nozzle 43, via an L-shaped stay 68h fixed to one side face (back face) of the restriction member 68 and the outer circumferential portion of the side portion nozzle 43. The device cooling nozzle holding portion 60 is provided so as to be arranged in line in the left-right direction with the thus configured side portion nozzle holding portion 58.

Referring to FIGS. 3, 5, and 7, the device cooling nozzle holding portion 60 has a movable plate 60a and a stay 60b.

The movable plate 60a has a configuration similar to that of the movable plate 58a, and is formed, for example, by bending a metal plate. The movable plate 60a has two vertically elongated hole portions 60c. Two bolts 60d as fixing members extending through the vertically elongated hole portions 60c and the left end portion of the main plate 56 fasten the movable plate 60a to the main plate 56 in cooperation with corresponding nuts 60e. According to the above configuration with regard to the movable plate 60a, the position of the movable plate 60a (the position of the device cooling nozzle 46) can be adjusted in the up-down direction relative to the main plate 56.

The device cooling nozzle 46 is fixed via a bolt 60g as a fixing member to a receiving portion 60f on the lower portion of the movable plate 60a. The bolt 60g extends in the up-down direction, and the position of the device cooling nozzle 46 can be adjusted about the axis of the bolt 60g. The device cooling nozzle 46 is fixed to the receiving portion 60f via the L-shaped stay 60b, and thus a constant orientation of the device cooling nozzle 46 is maintained. The stay 60b has an arc hole portion (not shown) that is coaxial with the bolt 60g in a plane view, and a bolt for fixing the stay 60b to the receiving portion 60f is arranged in this arc hole portion. According to the above configuration with regard to the stay 60b, the position of the stay 60b can be adjusted about the bolt 60g.

The body nozzle holding portion 59 is arranged on the upper right side of the thus configured device cooling nozzle 46.

Referring to FIGS. 4 to 6, the body nozzle holding portion 59 has two movable plates 591a and 592a and two stays 591b and 592b.

The movable plate 591a is provided in order to support the body nozzle 44 on the left side of a pair of the body nozzles 44 and 45, and the movable plate 592a is provided in order to support the body nozzle 45 on the right side of a pair of the body nozzles 44 and 45. The movable plates 591a and 592a are arranged with a space interposed between the movable plates 591a and 592a in the left-right direction.

The movable plates 591a and 592a are formed, for example, by bending metal plates. Two vertically elongated hole portions 591c and two vertically elongated hole portions 592c are respectively formed in the lower portions of the movable plates 591a and 592a. Bolts 591d and 592d as fixing members extending through the vertically elongated hole portions 591c and 592c and the main plate 56 are provided (two of the four bolts 591d extend through the vertically elongated hole portions 591c). The bolts 591d and 592d fasten the movable plates 591a and 592a to the main plate 56 in cooperation with the nuts 591e and 592e. According to the above configuration with regard to the movable plates 591a and 592a, the positions of the movable plates 591a and 592a (the body nozzles 44 and 45) can be adjusted in the up-down direction relative to the main plate 56.

In this embodiment, the two bolts 591d and the two nuts 591e on the left side collectively fix the movable plate 591a, the main plate 56, and the sub plate 55. In this embodiment, the bolts 592d and the nuts 592e collectively fix the movable plate 592a, the main plate 56, and the movable plate 58a of the side portion nozzle holding portion 58.

Receiving portions 591f and 592f are respectively formed on the upper portions of the movable plates 591a and 592a. The receiving portions 591f and 592f are formed by bending the middle portions in the up-down direction of the movable plates 591a and 592a, and extend so as to be inclined with respect to the horizontal direction. The body nozzles 44 and 45 corresponding to the receiving portions 591f and 592f are respectively fixed to the receiving portions 591f and 592f, via bolts 591g and 592g as fixing members. The receiving portions 591f and 592f extend substantially in the up-down direction. According to the above configuration with regard to the body nozzles 44 and 45, the positions of the corresponding body nozzles 44 and 45 can be adjusted about the axes of the bolts 591g and 592g. The body nozzles 44 and 45 are respectively fixed to the receiving portions 591f and 592f via the L-shaped stays 591b and 592b, and thus constant orientations of the body nozzles 44 and 45 are maintained.

The stays 591b and 592b respectively have arc hole portions (not shown) that are coaxial with the corresponding bolts 591g and 592g in a plane view, and bolts for fixing the stays 591b and 592b to the receiving portions 591f and 592f are arranged in these arc hole portions. According to the above configuration with regard to the stays 591b and 592b, the positions of the stays 591b and 592b can be adjusted about the corresponding bolts 591g and 592g.

As described above, the thus configured first unit 25 is arranged on the one end portion 109a side of the tank 100. Meanwhile, the second unit 26 is arranged on the other end portion 109b side of the tank 100.

Referring to FIG. 2, the second unit 26 has an arm support portion 71, a swing arm 72, and a sub unit 31'.

The arm support portion 71 is a member, for example, in the shape of an L, and has a shape extending upward from the bottom wall of the accommodation chamber 10. A tip end portion of the arm support portion 71 has a support shaft 71a, and supports the swing arm 72 such that the swing arm 72 can be swung about the support shaft 71a.

The swing arm 72 is held such that the swing arm 72 can swing about the support shaft 71a using an unshown power source. The swing arm 72 has a configuration in which two plate members each substantially in the shape of an I in a side view are arranged in parallel to each other with a space interposed between the plate members in the left-right direction, and these two plate members are fixed to each other via a plurality of shaft members.

The base end portion of the swing arm 72 is coupled to the support shaft 71a in a swingable manner. The middle portion of the swing arm 72 has a projecting stopper receiving portion 73, and is configured to be received by a stopper 74 fixed to the second base portion 17. When the stopper receiving portion 73 is received by the stopper 74, the swing arm 72 is kept in an orientation facing the tank 100. The sub unit 31' is attached to the tip end portion of the swing arm 72.

The sub unit 31' is provided in order to hold the nozzles 40 of the nozzle unit 39, on the other end portion 109b side of the tank 100. The sub unit 31' is arranged to swing about the support shaft 71a integrated with the swing arm 72. The nozzles 40 supported by the sub unit 31' and the nozzles 40 supported by the sub unit 31 are arranged to be disposed symmetrically along the longitudinal direction of the tank 100.

The sub unit 31' has a main plate 56' having a configuration substantially the same as that of the main plate 56, and the main plate 56' is used to support the nozzles 40. The second unit 26 has a configuration substantially the same as that of the first unit 25 except that there is no configuration for displacing the nozzles 40 relative to the tank 100 along the longitudinal direction of the tank 100 in a state where the nozzles 40 are oriented so as to face the tank 100. Thus, a detailed description of the sub unit 31' of the second unit 26 and the nozzle unit 39 supported by the sub unit 31' has been omitted.

According to the above configuration, in a state where the tank 100 is held by the support shaft 18 inside the accommodation chamber 10, the swing arms 28 and 72 locate the nozzles 40 near the corresponding end portions 109a and 109b of the tank 100. As a result, the nozzles 40 are located around the corresponding end portions 109a and 109b of the tank 100, and, in this state, the nozzles 40 eject a gas flow toward the tank 100, thereby cooling the tank 100. At this time, the roller 22 rotates the support shaft 18 in accordance with the driving of the electric motor 21 in the rotational drive mechanism 19. Accordingly, the support shaft 18 and the tank 100 rotate at a predetermined rotational speed.

As shown in FIG. 8, the tank cooling device 4 is configured to cool a tank 100' and the like having a tank main body shape different from that of the tank 100 as well. The tank 100' and the tank 100 are different from each other in that the shapes of tank main bodies 101' and 101 are different. The shape of the tank main body 101' is shorter in the tank longitudinal direction and has a larger diameter than that of the tank main body 101. When the tank cooling device 4 cools the tank 100', the position of the cylinder rod 37 in the cylinder mechanism 29 is adjusted, and thus the positions of the nozzles 40 in the tank longitudinal direction of the first unit 25 are adjusted. Accordingly, one end portion 109a' of the tank 100' can be cooled as in the case of the one end portion 109a of the tank 100. Note that the position of an end portion 109b' of the tank 100' is the same as that of the end portion 109b during cooling of the tank 100.

When the tank 100 (or the tank 100') is carried out of the accommodation chamber 10 after the cooling treatment, the swing arms 28 and 72 are swung about the corresponding support shafts 27a and 71a, and convey the corresponding nozzles 40 to the upper side of the tank 100. Accordingly, the tank 100 can be conveyed out of the accommodation chamber 10 without being disrupted by the nozzles 40 or the like.

As described above, according to this embodiment, the nozzles 40 supply cooling gas to the outer surface of the tank 100, with the cooling gas assisted by compressed gas in the nozzle 40. Accordingly, the nozzles 40 can blow a gas flow containing the cooling gas and the compressed gas onto the outer surface of the tank 100. A large amount of such a gas flow at a low temperature is blown onto the outer surface of the tank 100 in a short time. Accordingly, heat retained by the tank 100 which has been heated is quickly released from the outer surface of the tank 100 to the outside of the tank 100. Thus, the tank cooling device 4 can more quickly cool the tank 100.

Since the tank 100 is constituted by a plurality of members (synthetic resin and metal) having different heat conductivities, the cooling speed varies between the members of the tank 100. However, according to this embodiment, a gas flow is supplied from the nozzles 40 to each of the plurality of members (the tank main body 101 and the end members 102) having different heat conductivities, and thus the entire tank 100 can be more quickly cooled.

According to this embodiment, a plurality of such nozzles 40 are provided, and at least one nozzle 40 is comprised to supply the gas flow to each of the plurality of members (the tank main body 101 made of synthetic resin and the end members 102 made of metal). With this configuration, the cooling speed of the tank 100 can be increased regardless of differences between the materials forming the portions of the tank 100.

According to this embodiment, the end member nozzles 41 and 42 are comprised to supply a gas flow toward the end members 102. With this configuration, the end members 102 having better heat dissipation feature than that of the tank main body 101 are cooled with a gas flow from the end member nozzles 41 and 42, and thus the tank 100 can be more quickly cooled.

According to this embodiment, the end member nozzles 41 and 42 are comprised to supply a gas flow toward the boundary portions 118 between the tank main body 101 made of synthetic resin and the end members 102 made of metal. With this configuration, the boundary portions 118 between members having different heat conductivities become non-continuous portions regarding heat conduction, and heat is likely to accumulate near the boundary portions 118. Accordingly, if the end member nozzles 41 and 42 are used to cool the boundary portions 118, the boundary portions 118 where heat is likely to accumulate in the tank 100 can be more surely cooled. As a result, the cooling speed of the tank 100 can be increased.

According to this embodiment, the side portion nozzles 43 are comprised to supply a gas flow toward the corresponding end portions 109a and 109b of the tank main body 101. With this configuration, the portions of the tank main body 101 to which heat is easily transferred from the end members 102 due to being relatively closer to the end members 102 can be more surely cooled using the side portion nozzles 43. As a result, the cooling speed of the tank 100 can be increased.

According to this embodiment, the body nozzles 44 are comprised to supply a gas flow toward the middle portion 108 (the end portions 109 and the body), in the longitudinal direction of the tank 100, of the tank 100. With this configuration, the gas flow from the body nozzles 44 is supplied to the middle portion 108 having a large surface area on the tank main body 101. Accordingly, the cooling speed of the tank 100 can be made more uniform. As a result, the tank 100 can be more quickly cooled.

According to this embodiment, each of the nozzles 40 has the suction portion 52 that sucks in cooling gas supplied into the accommodation chamber 10 and the ejection portion 53 that ejects the cooling gas assisted by the compressed gas. With this configuration, the cooling gas is sucked from the suction portions 52 into the nozzles 40 in accordance with the ejecting of the compressed gas. The cooling gas is involved with the compressed gas inside the nozzles 40, and is discharged together with the compressed gas from the ejection portions 53 of the nozzles 40. With this configuration, the nozzles 40 can cause the compressed gas to carry a large amount of cooling gas. As a result, a larger amount of gas flow can be supplied to the tank 100 in a short time. Thus, the tank cooling device 4 can cool the tank 100 in a shorter time.

This embodiment is provided with the guide members 12 for guiding the cooling gas supplied into the accommodation chamber 10, toward the nozzles 40 and the tank 100. With this configuration, the amount of cooling gas supplied to the nozzles 40 and the tank 100 per unit time can be increased. Accordingly, the tank 100 can be more quickly cooled.

This embodiment is further provided with the restriction members 68 for restricting returning of the gas flow discharged from the nozzles 40, from the tank 100 toward the nozzles 40. With this configuration, part of the gas flow from the nozzles 40 toward the tank 100 is reflected by the tank 100, and is oriented toward the nozzles 40. If such a gas flow moving toward the nozzles 40 is received by the restriction members 68, a situation is more surely suppressed in which a high-temperature gas flow reflected by the tank 100 returns to the suction portions 52 of the nozzles 40.

In the description above, an embodiment of the present invention was described, but the present invention is not limited thereto, and various modifications may be made within the scope described in the claims. For example, the following modifications are possible.

(1) In the foregoing embodiment, an example was described in which electric fans are used as the guide members 12. However, there is no limitation to this. For example, flow guide members such as plates may be used as the guide members.

(2) Furthermore, in the foregoing embodiment, a configuration was described in which the end member nozzles 41 and 42 cool the boundary portions 118 of the tank 100. However, there is no limitation to this. For example, a dedicated nozzle for cooling the boundary portions 118 may be provided other than the end member nozzles 41 and 42.

(3) Furthermore, it is sufficient that the tank cooling device 4 of the present invention is provided with at least one nozzle 40, and there is no limitation on the other aspects of the configuration.

INDUSTRIAL APPLICABILITY

The present invention is broadly applicable to tank cooling devices.

LIST OF REFERENCE NUMERALS

4 Tank cooling device
5 Accommodation chamber
12 Guide member
40 Nozzle
41, 42 End member nozzle
43 Side portion nozzle
44, 45 Body nozzle
52 Suction portion
53 Ejection portion
68 Restriction member
100 Tank
101 Tank main body
102 End member
108 Middle portion of tank
109a, 109b End portion of tank main body
118 Boundary portion

The invention claimed is:

1. A tank cooling device, including:
a nozzle configured to supply cooling gas for cooling a tank to an outer surface of the tank, with the cooling gas assisted by compressed gas in the nozzle;
an accommodation chamber configured to accommodate the tank and the nozzle and to be supplied the cooling gas, and
a guide member for guiding the cooling gas supplied into the accommodation chamber toward the nozzle and the tank, wherein
the guide member includes a blower disposed in the accommodation chamber,
the nozzle includes a suction portion that sucks in the cooling gas, and an ejection portion that ejects the cooling gas with the compressed gas, and
the nozzle is configured such that the suction portion faces toward the blower and sucks the cooling gas blown by the blower.

2. The tank cooling device according to claim 1, further comprising:
a restriction member for restricting returning of the cooling gas and the compressed gas discharged from the nozzle, from the tank toward the nozzle.

3. The tank cooling device according to claim 1, wherein the suction portion is disposed in an upward posture at a lower side of the blower.

4. The tank cooling device according to claim 1, wherein the accommodation chamber is a square in shape.

5. The tank cooling device according to claim 1, wherein the tank includes one end portion and an other end portion
the nozzle is provided on each of one end portion side of the tank and the other end portion side of the tank,
the blower includes a first blower for the nozzle provided on the one end portion side of the tank and a second blower for the nozzle provided on the other end portion side of the tank,
the first blower is oriented toward the nozzle provided on the one end portion side of the tank and sends the cooling gas toward the nozzle provided on the one end portion side of the tank, and
the second blower is oriented toward the nozzle provided on the other end portion side of the tank and sends the cooling gas toward the nozzle provided on the other end portion side of the tank.

\* \* \* \* \*

UNITED STATES PATENT AND TRADEMARK OFFICE
CERTIFICATE OF CORRECTION

PATENT NO. : 10,611,115 B2
APPLICATION NO. : 15/554355
DATED : April 7, 2020
INVENTOR(S) : Akihito Yamamoto et al.

Page 1 of 1

It is certified that error appears in the above-identified patent and that said Letters Patent is hereby corrected as shown below:

In the Claims

In Column 19, in Claim 1, at Line 35, "gas in" should be changed to --gas supplied to--; and
In Column 20, in Claim 5, at Line 24, "one" should be changed to --the one--.

Signed and Sealed this
Twenty-third Day of June, 2020

Andrei Iancu
*Director of the United States Patent and Trademark Office*